United States Patent
Shuster (10) Patent No.: US 8,984,102 B2
(45) Date of Patent: Mar. 17, 2015

(54) REGISTRATION AND USE OF PATTERNS DEFINED BY EXPRESSIONS AS DOMAIN NAMES

(76) Inventor: Gary Stephen Shuster, Fresno, CA (US)

( * ) Notice: Subject to any disclaimer, the term of this patent is extended or adjusted under 35 U.S.C. 154(b) by 597 days.

(21) Appl. No.: 12/710,283

(22) Filed: Feb. 22, 2010

(65) Prior Publication Data

US 2010/0217842 A1  Aug. 26, 2010

Related U.S. Application Data

(60) Provisional application No. 61/154,133, filed on Feb. 20, 2009.

(51) Int. Cl.
  *G06F 15/16* (2006.01)
  *G06F 15/177* (2006.01)
  *H04L 29/12* (2006.01)

(52) U.S. Cl.
  CPC ...... *H04L 29/12594* (2013.01); *H04L 61/3015* (2013.01); *H04L 61/3045* (2013.01)
  USPC ............................ 709/220; 709/203; 709/224

(58) Field of Classification Search
  CPC ........................ H04L 61/3015; H04L 61/3045
  USPC .......................................... 709/203, 220–224
  See application file for complete search history.

(56) References Cited

U.S. PATENT DOCUMENTS

| | | | |
|---|---|---|---|
| 6,687,746 B1 | 2/2004 | Shuster et al. | |
| 6,895,430 B1 * | 5/2005 | Schneider | 709/217 |
| 6,944,661 B2 | 9/2005 | Moore et al. | |
| 6,963,929 B1 | 11/2005 | Lee | |
| 7,113,581 B2 | 9/2006 | Benedyk et al. | |
| 7,167,904 B1 * | 1/2007 | Devarajan et al. | 709/218 |
| 7,188,138 B1 | 3/2007 | Schneider | |
| 7,194,552 B1 | 3/2007 | Schneider | |
| 7,464,136 B2 * | 12/2008 | Lemson et al. | 709/203 |
| 7,664,831 B2 * | 2/2010 | Cartmell et al. | 709/219 |
| 7,747,592 B2 * | 6/2010 | Thomas | 707/705 |
| 7,774,432 B2 * | 8/2010 | Cartmell et al. | 709/219 |
| 8,185,628 B2 * | 5/2012 | Hu et al. | 709/225 |
| 8,543,732 B2 * | 9/2013 | Ryan | 709/245 |
| 2001/0044304 A1 * | 11/2001 | Truong et al. | 455/435 |
| 2002/0103820 A1 * | 8/2002 | Cartmell et al. | 707/500 |
| 2004/0059793 A1 * | 3/2004 | Gruber et al. | 709/217 |
| 2004/0172465 A1 * | 9/2004 | Shuster et al. | 709/223 |
| 2005/0172031 A1 * | 8/2005 | Adelman | 709/245 |

(Continued)

OTHER PUBLICATIONS

Joel D. Canfield; Why Verisigns Wildcard DNS is a Bad Idea; Commentary & Society; Sep. 18, 2003; pp. 1-5; http://evolt.org/node/60224.

(Continued)

*Primary Examiner* — Joshua Joo
(74) *Attorney, Agent, or Firm* — Jonathan Jaech; Snell & Wilmer L.L.P.

(57) ABSTRACT

A domain name registration service permits registrants to register names that are defined by a pattern-matching expression that may include one or more wildcard values in any portion of the domain or subdomain name. A domain name server utilizes pattern matching with expressions, such as REGEX systems, to parse incoming domain name requests to identify text strings that conform to the domain defined by the registered regular expression. Other components assign economic value to defined patterns and prevent conflicts between registered patterns and domain names.

9 Claims, 3 Drawing Sheets

(56) References Cited

U.S. PATENT DOCUMENTS

| | | | |
|---|---|---|---|
| 2005/0203891 A1* | 9/2005 | Broadhurst et al. | 707/3 |
| 2005/0267968 A1* | 12/2005 | Fearing et al. | 709/224 |
| 2008/0071823 A1* | 3/2008 | Fellman | 707/102 |
| 2010/0106731 A1* | 4/2010 | Cartmell et al. | 707/748 |

OTHER PUBLICATIONS

RFC-4592 The Role of Wildcards in the Domain Name System; Network Working Group; Jul. 2006; pp. 1-21; http://tools.ietf.org/html/rfc4592.

* cited by examiner

REGISTRATION AND USE OF PATTERNS
DEFINED BY EXPRESSIONS AS DOMAIN
NAMES

CLAIM OF PRIORITY UNDER 35 U.S.C. §119

This patent application claims the benefit of U.S. Provisional Patent Application No. 61/154,133, filed Feb. 20, 2009, which is specifically incorporated by reference herein in its entirety.

BACKGROUND

1. Field

The present disclosure is directed towards processing and handling information requests made using Uniform Resource Locaters in TCP/IP networks, using a domain name registration and server system.

2. Description of the Related Art

The Domain Name System (DNS) is one of two principal name systems used by the Internet, the Internet Protocol (IP) address system being the other. The Domain Name System defines domain names and provides translation services between domain names and numeric IP addresses. The DNS is implemented using Internet name servers and the IP communications protocol. A name server stores and maintains DNS records, such as address (A) records, name server (NS) records, and mail exchanger (MX) records for a domain name. A DNS record associating domain names to specific IP addresses may be referred to as a zone file. A DNS name server responds to queries that specify domain names with the corresponding IP addresses contained in its zone file. Thus, the DNS operates as an Internet service that translates alphabetic domain names into numeric IP addresses required for accessing information using the World Wide Web or other Internet services. For example, the domain name www.example.com might translate to 198.116.332.6 using an association stored in a DNS zone file.

Information in a zone file is created and maintained via a domain name registration service. Designated entities are authorized to create and maintain DNS records. A person desiring to register a new domain name may submit a registration request to one of these designated entities. The registration service checks to ensure that the domain name is, in fact, new and not already in use, and ensures that the applicant complies with certain administrative requirements for registration of domain names, in exchange for a nominal fee. Once all registration requirements are satisfied and fees are paid, the registration authority causes the relevant DNS records to be updated with the new information. Thereafter, queries using the newly registered domain name will be directed to an IP address specified in the zone file for that name.

Those who own trademarks or well-known company or brand names or domain names may be vulnerable registration of domain names that are variants of the trademarks or well-known names, such as common misspellings. Such variant domain names may be used to confuse consumers, compete with the trademark owner, disparage the trademark, company or brand name, extract payment by the owner to transfer the domain name, or simply to exploit goodwill acquired by the original domain name for another purpose. For example, a company called "Acme" having a website corresponding to a domain name acme.com may be vulnerable to someone registering the domain name acmesucks.com. For further example, a high-traffic domain such as homedepot.com might be exploited by those registering misspellings of the domain, such as, for example, hmedepot.com. It can be expensive and burdensome for holders of well-known domain names or marks to protect these properties by registering a large number of common variations. Defensive registration of variant names becomes increasingly expensive as the number of characters in the domain name increases.

In current practice, a user registers domain names individually. However, existing domain name server technology also allows the use of a wildcard to direct all traffic requesting sub-domains of a root domain to be directed to a single IP address. For example, a DNS record formatted as "*.shuster.com" may direct all requests using domain and sub-domain names ending in ".shuster.com" to a single IP address, e.g., 151.207.245.67. Additionally, current DNS practice permits exceptions to be configured such that, for example, internal.shustercom points to a different IP address, e.g., 151.207.245.67, while all sub-domains not specifically configured are defaulted to point to a different address such as 151.207.245.68.

The transmission of data from a web browser to a web server, from a mail client to a mail server, and from other clients to their respective servers (in from the server back to the client) are provided to allow the servers and clients to identify the domain name for which the transaction is being conducted. For example, with respect to web transactions, when a port 80 request arrives for a web page, it arrives in the form of a socket connection to an IP address, which then transmits a requested file path (i.e., "GET/index.htm"). The browser, in modern browser/server combinations, transmits the domain name of the server the user is attempting to access, transmitting, for example, "HTTP_HOST:shuster.com". Using the IP address, HTTP_HOST, or a combination, together with the requested file path, the server maps the request to a specified file (or executable or script) and returns the data in accordance with its programming. When a zone file includes a wildcard representation for a subdomain, the DNS server may thereby be configured to return the same IP address for all wildcard sub-domains. In cooperation with the DNS server, the corresponding web server may be configured to return data provided specially for one or more of those sub-domains, optionally using a wildcard configuration. Optionally, the web server may use the name of one or more of the sub-domains to further identify the file path, e.g., the server may modify a GET request specifying "http://gary.shuster.com" to read "GET/gary/shuster.com". Thus, existing technology permits wildcard entries in zone files of a domain name system to denote subdomains off of any domain that is second-level or higher, for example, *.second.com.

However, existing addressing technology cannot address variations within the root domain itself, using wildcard or other methods. Instead, existing technology maintains separate registration and handling of each unique second-level domain name. Therefore, existing wildcard techniques cannot prevent registration and use of similar root domains by different entities, nor the resulting deleterious effects of such practices as discussed above. If would be desirable, therefore, to provide new methods and systems for registration and use of domain names that overcomes these and other limitations of the prior art.

SUMMARY

The systems and methods disclosed herein enable protection of root domain variants by enabling registration and use of a set of domain names defined by an expression, for example, a regular expression representing one or more characters of a domain name using wildcard characters or other pattern-matching symbology. In accordance with one embodiment, a domain name purchaser or registrant may register a domain name with one or more wildcards contained within portions of a domain or sub-domain name, such as *patents*.shuster.com. In one implementation, wildcard system incorporates complex pattern matching, using the regular expressions ("REGEX") system. In other embodiments, complex pattern matching uses a modified regular expressions system that is customized for use in domain name registration. Different modifications to the regular expressions system may be made depending on the natural language (e.g., English, French, German) in which the domain name registration request is made.

A registration server uses a regular expression module or modified regular expression module during the registration process to determine a domain set, including specific members and size. "Members" here refers to the particular domain names included in the set, and "size" refers to the total number of set members. The server checks each member of the set against registered domain names in the DNS, and identifies any numbers of the set that are already registered. Optionally, the registration server serves a list of set members to a client device operated by the prospective registrant, together with a list of domain names that are generated by the expression but already registered by other parties in the DNS. These already-registered names are excluded from duplicate registration and are identified so the prospective registrant is informed about the excluded domain names before committing to register the set of included domain names. The registration server provides a count of unregistered domain name set members, and a corresponding fee based on the number of set members, to the prospective registrant.

Many expressions define an infinite number of set members. For example, the expression "*infinitycorp.com," where "*" designates any non-negative real number of characters of any value, identifies an infinite number of character strings all ending in "infinitycorp.com." The practical reality is that most members of the infinite set have nearly zero practical value. For example, almost zero value inheres in set members where "*" represents a very large number of characters such as, for example, 100 characters or greater. Therefore, a useful modified expression rule may limit wildcard representations to a finite, relatively small number of characters. Although many registrants may choose expressions that result in a finite number of members, the present technology may in some circumstances permit the registration of a pattern-matching expression that includes an infinite number of possible domain names. However, special system elements should be in place to enable this capability, as described in the detailed disclosure below.

In one embodiment, each expression, once approved at the registration server, is registered in a database of the DNS. The database may comprise a zone file or operate in cooperation with a zone file. The expression may include terms that specifically exclude already registered names or other forbidden text strings. In the alternative, or in addition, provided that the expression used does not match an infinite number of domain names, each domain name in the set may be individually recorded in a DNS database associated with the IP address designated by the registrant, using an algorithm that generates each domain name in a specified sequence using the expression.

DNS name servers may be configured to parse domain name requests to detect any requests having a root domain conforming to the REGEX or other expression rules provided in its database. Each expression rule in the DNS database may be associated with a particular numeric IP address. If the name server determines that a particular request uses a root domain conforming to an expression in its database, it may return the IP address associated with the expression to the client from which the request originated. In the alternative, or in addition, the DNS name server may maintain conventional zone files that include a separate entry for every root domain that is defined by a registered expression, wherein each entry is associated with the same IP address. In such case, the name server returns the registered IP address in response to any request using any one of the root domains defined by the registered expression.

In accordance with a further embodiment, the name server analyzes the IP address making the request and returns different results based on the IP address making the request. The results may be returned to the requesting IP address in accordance with instructions residing on a database. For example, an IP address requesting web content may be analyzed to determine the geographic location or other characteristic of the requesting device, such as language preferences and other data in the http header and IP address. The web server may also be configured so that the manager may configure it to return different web sites based on the characteristics of the requesting computer. Thus, for example, a request for "governor.shuster.com" may return the IP address of the server with a side dedicated to the governor of the state in which the user or requesting IP is located. Alternatively, the web server may return a redirection to or data from a site about the governor of the state in which the user or requesting IP is located.

BRIEF DESCRIPTION OF THE DRAWINGS

In the figures and detailed description that follows, like numerals are used to indicate like elements found in one or more of the figures.

DETAILED DISCLOSURE

Figure 1:
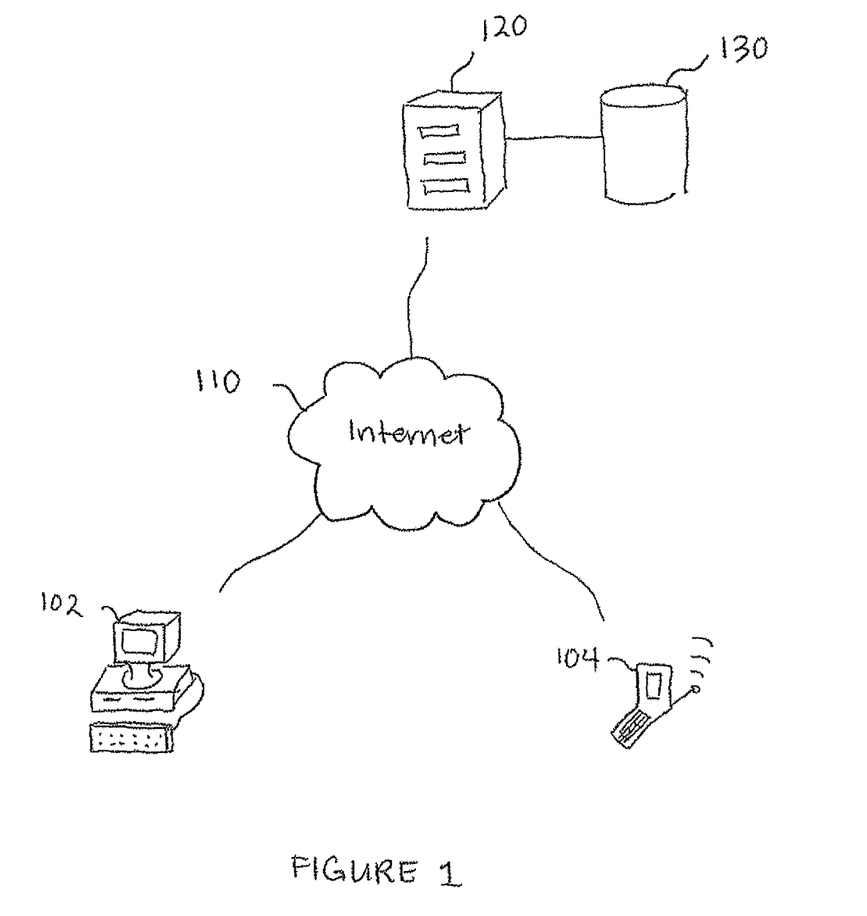
FIG. 1 is a block diagram showing a system for registration and use of patterns defined by expressions as domain names.

FIG. 1 shows an example of a system for registration and use of patterns defined by expressions as domain names. A user operates a client 102 by entering data via an input device, such as a keyboard, mouse, or other input device. The client 102 further comprises a graphical interface to display the output resulting from data that was input by the client. In the embodiments disclosed herein, the input comprises a domain name or pattern-matching expression. Once the domain name is input by the client 102, it is transmitted via the Internet 110 to a domain name system (DNS) name server 120 which uses a database 130 that associates the domain name into numerical (binary) identifiers associated with networking equipment for the purpose of locating and addressing the appropriate web server. The name server 120 may be specially configured using software or firmware to operate in the manner described herein, using conventional hardware elements.

In a preferred embodiment, the name server 120 comprises or is associated with an application that allows it to parse domain name requests according to wildcard or REGEX expression. The web servers are preferably configured to return content based on the parsing of the root domain name. Domain names typically comprise hierarchical parts, for example, "third.second.top" wherein the top level name is a system-defined three-character label such as, for example, "com," "net," or "org" or a two-character country code such as "us," either of which is preceded by a user-defined second-level domain name of two or more characters. The second level name may be preceded by any number of higher levels of subdomains. As used herein, a "root domain" refers to a domain name consisting of a second level domain and a top level domain, for example, "shuster.com." It should be appreciated that use of wildcards to represent third-level or higher level domains is known in the art. Use of wildcards for any part of a second level domain is not known, and present DNS systems lack features suitable for implementing the flexible root domain capability as described herein.

The web servers may optionally be configured to return different content based on the characteristic of the requesting device, such as a location of a mobile device 104 submitting a domain name request. The server may return different IP address results depending on where the request originates from. This feature may be implemented using regional coding in a zone file, or using regional-specific zone files in different name servers servicing name requests in from different geographic areas.

Figure 2A:
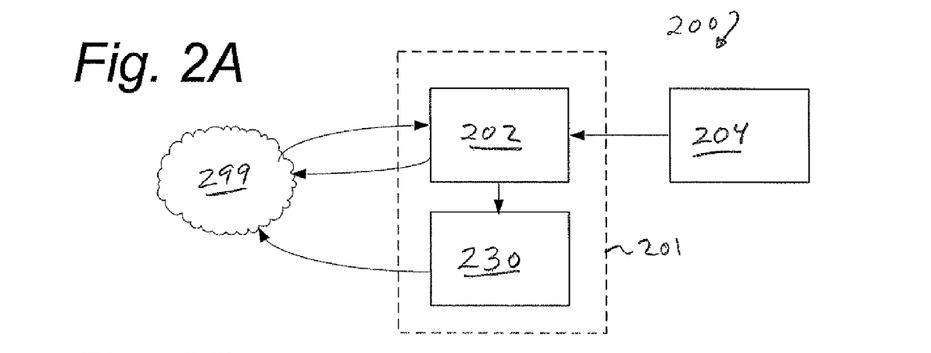
FIG. 2A is a block diagram showing a system for handling IP requests using flexible expression-based root domain names, according to an implementation independent of DNS zone files.

Systems suitable for implementing the flexible root domain capability as described herein may be developed in various ways. These may be classed as belonging to one of two types, "separate" or "integrated." FIG. 2A shows a separate type of system 200, while FIG. 2B shows an integrated type of system 250.

In a separate system 200, a DNS system 201 uses separate processes 202, 230 to determine an IP address for incoming requests using a Uniform Resource Locater (URL) containing a root domain. A first separate processing module 202, which may be placed upstream or downstream of the DNS zone file servers, processes incoming IP requests from wide area network 299 using a expression to identify an IP address for expression-defined root domains. If an upstream module 202 identifies an IP address using an expression-based parser, it returns the address to the client via network 299, thereby fulfilling the request without reference to the DNS' regular zone files 203. In a variation of system 200, module 202 may be placed downstream, processing IP requests after and if the name server's regular zone file process 230 does not identify a listing for a requested root domain in its conventional zone file. In both upstream and downstream placement, the name system's regular DNS list process 230 is used to identify the IP address using a conventional zone file, in a separate process from the separate expression-defined domain module 202. An advantage of the separate system 200 is that expression processor 202 can operate independently of regular name server processing 230. However, upstream placement also may add overhead to processing of all incoming requests, whether or not using expression-defined domain names. Conversely, separate downstream placement adds overhead to all IP requests using expression-defined domain names (but not to those using conventional domain names) by first processing all incoming requests using a conventional DNS zone file.

System 200 may further include a registration process 204. The registration process develops and registers expressions for registration with expression processor 202, via a client-server interactive process. An example of a method of registering a domain name that may be implemented for a registration process is provided later in the specification.

Figure 2B:
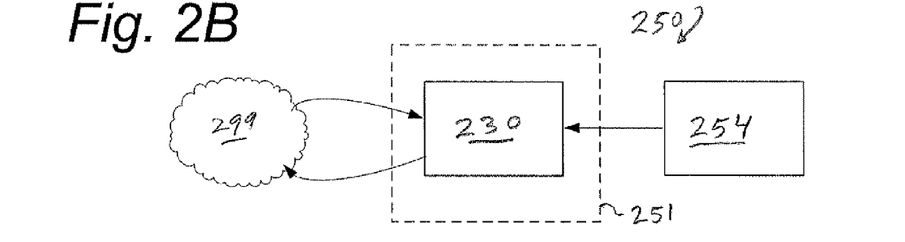
FIG. 2B is a block diagram showing a system for handling IP requests using flexible express-based root domain names, according to an implantation integrated with DNS zone files.

In an integrated type of system 250, as shown in FIG. 2B, a name server process 251 processes incoming IP address requests using a conventional zone file. The overall system 250 differs from a conventional process, however, in that the zone file is supplied with records originating from an expressions registration component 254. Registration component 254 may be similar to component 204 described above, but differs in the form of records maintained in the DNS. Instead of maintaining a record of registered expressions, component 254 provides information from which the zone file process 230 creates a DNS record for each member of the set of domain names encompassed by each registered expression. For example, the registration component may generate and provide each member of a domain name set encompassed by each registered expression. The zone file component may then create and maintain a record for each domain name. In the alternative, the registration module 254 may provide the expressions to the zone file component 230 or to some intermediate component (not shown), from which the component 230 or intermediate component may generate every member of the domain name set for a record in the zone file. It should be apparent that an advantage of system type 200 is that patterns resulting in an infinite number of matches may be registrable and useful. Such expressions are not useful in a system of type 250, because it is not possible to create, maintain or use a zone file containing an infinite number of entries.

Figure 3:
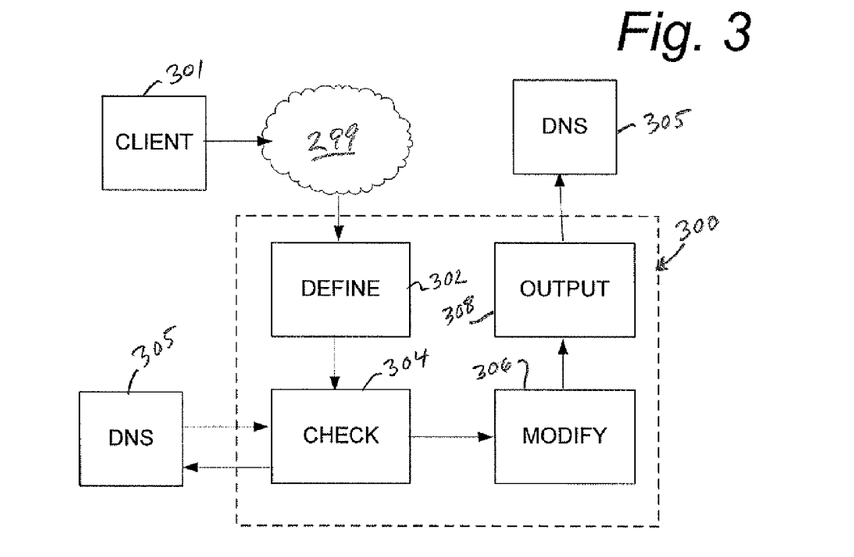
FIG. 3 is a block diagram showing an example of a system for registering expressions defining sets of root domains.

Further details concerning a registration component 300 are provided with reference to FIG. 3. A registration component may be implemented as interactive modules within one or more computer servers. The one or more servers may be dedicated to registration of expressions or domain names, or may serve other functions also. A first module 302 defines expressions in an interactive process with a client 301. The client 301 may be a remote client communicating with the registration component 300 via a wide area network 299. The expression definition module may enable an interactive process by which a client develops and refines an expression that defines a domain name set for registration. Although module 302 is shown only in communication with client 301, it should be appreciated that the registration component 300 may communicate with its clients at any appropriate time during registration processing.

A second module 304 of the component 300 may evaluate one or more expressions defined by interaction with client 301. The evaluation process may involve communicating with the targeted DNS 305 to determine which, if any, domain names in a domain name set are already registered in the DNS. The evaluation process may perform other functions, such as counting the number of domain names in the set defined by an expression, checking to see if an expression conforms to rules and policies established for registration of expression, and setting a price for registration of an expression.

A third module 306 may modify expressions selected for registration. For example, the module may add terms to an expression to specifically exclude previously-registered individual root domains from the set of domains that would otherwise be returned by an expression. Other modifications may include adding or modifying terms to reduce the domain set size for the expression below a threshold value. Other modifications may include adding or modifying terms so that the expression complies with policies established for the system. For example, a policy may prohibit or restrict expressions of the form "*.X.COM," wherein "X" is a recognized surname and COM is any recognized top-level domain, but may permit expression of the form "*YX.COM," wherein "Y" is a personal name.

A fourth module 308 may provide registrable output to a DNS system 305 at the conclusion of a registration process. As previously noted, output may comprise a completed expression for registration. In the alternative, or in addition, output may comprise a list or other expression of each member in a set of domain names returned by a registered expression.

Figure 4:
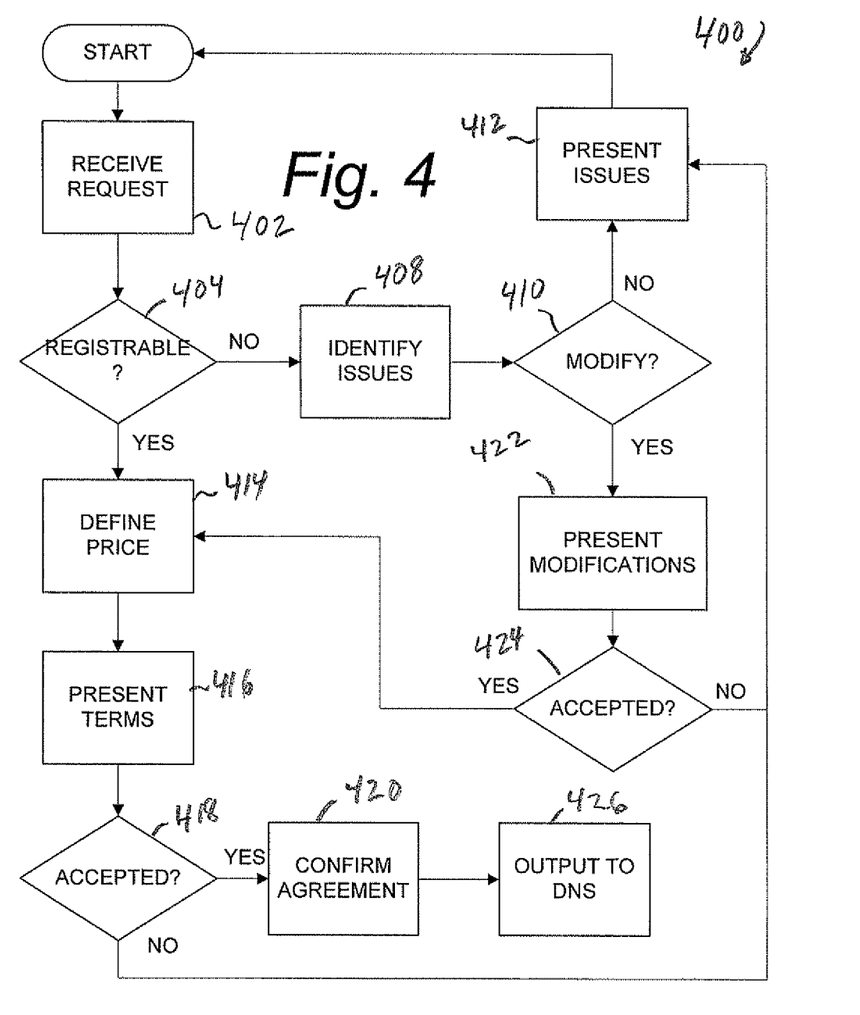
FIG. 4 is a flow chart showing an example of a method for registering expressions defining sets of root domains.

FIG. 4 shows a method 400 that may be performed by a registration component. An initial step comprises receiving a request to register an expression. The expression may be an expression in a defined expression language, for example, a regular expression expressed in a PERL, TCL, RUBY, JAVA, or similar scripting language, or POSIX (Portable Operating System Interface For Unix). An alphabet containing a finite number of characters is also defined, as a constraint on the expression outputs, for example, ASCII or Unicode. Other pattern matching systems may also be adopted, whether or not strictly considered a regular expression language, so long as the system provides definite results. With a defined expression language and alphabet, a string of characters entered or otherwise defined by client-server interaction can represent an expression that is capable of being parsed to recognize hits or to generate a set of resulting character strings, so long as the set is not infinite. Another constraint in the present application is that each character string in the resulting set should be in the form of a root domain as defined by the DNS. The expression may be defined by receiving a character string from the client, by receiving client inputs interpreted as selecting expression elements, or some combination of the foregoing.

At 404, the registration component may test a received expression to ensure that it conforms to defined requirements. These requirements may include, for example, that the expression be properly expressed in the selected expression language, result in an ascertainable set of root domain labels, and not include any previously registered root domains in its result set. Optionally, a finite result set may be required. Other policies may prevent registration of expressions that too broadly encompass surnames, geographical names, or words. "Too broadly" is a matter of DNS system policy. Suggesting appropriate details for such a policy is beyond the scope of this disclosure; however, such policies should be expected as useful and necessary, and should come into play during registration.

At 408, the registration component may identify issues or conflicts discovered in the testing process 404, if the process determines that a particular registration is not registrable. A conflict should be detected whenever an expression matches one or more registered domain names, or matches anything matched by another registered expression. Such conflicts may be corrected by adding terms to narrow the expression so that it no longer matches the other domain names or other expression matches. In many cases it may be possible to modify the expression so that it is registrable, and the registration component may make this determination at 410. For example, the component may generate a list of different modified expressions, each of which would separately be registrable, and present the list to the client 422. If one of the modified expressions is acceptable to the end user, the client may indicate selection of a particular modified expression in an acceptance process 424. If need be, modified expressions may simply expressly exclude particular registered domain names. For example, the expression "*shuster*.com" might be modified to "*shuster.com <exclude> (garyshustercom)" to expressly exclude a previously registered domain of garyshuster.com.

Conversely, some expressions may not be readily modifiable, for example, an expression may not define any acceptable root domains, may be expressed in incorrect terms, or may sweep so broadly that suitable modifications cannot be determined. In such case, the registration component may simply report the issues with the expression to the client 412, and terminate the registration process. Likewise, if the client does not accept a particular modified expression 424, the registration process may terminate. After termination, the client may elect to initiate a new process at 402.

If a modified expression is compliant with applicable rules and accepted by the client 424, 404, the registration engine may define a price 414 for the selected expression. The engine may apply various factors in price setting. One important factor for expression defining a finite set of results may be the result set size. Price may vary in proportion, linearly or non-linearly, with set size. Another factor may include search engine popularity. For example, the registration may assess the popularity of a root domain set, or of a fixed portion of an expression, using a weighted sum based on popularity of individual members in search engine requests. For infinite sets, the registration component may determine the relative "size" of the infinite set. For example, the expression "*johndoe*.com" results in a broader set of root domain names than the expression "*andrewfrankpfeffertonthethird*.com," and should be correspondingly more valuable. From the foregoing examples, it can be seen that the value of an expression may be inversely proportional to the number of fixed characters that it contains, depending on the form of expression.

At 416, the registration system may present the terms for registering a particular expression, including the price and periodic maintenance cost, to the client. If the client accepts the terms 418, the registration component may confirm the agreement 420. For example, the registration component may obtain an initial payment, or payment authorization, from the client using any suitable method. After the registration agreement has been confirmed, the registration input may provide the registration details 426 to the applicable domain name system record keeping server. Registration details, as previously noted, may include the expression and associated IP address selected by the client. In the alternative, registration details may, for finite expressions, include a list of every root domain encompassed by the expression and the associated IP address selected by the client. Registration information may further include information identifying the registrant, registrar, and so forth as known in the art. If the client does not accept the terms 418, the process may terminate, reset to start, or take other action as deemed desirable by the registrar.

Figure 5:
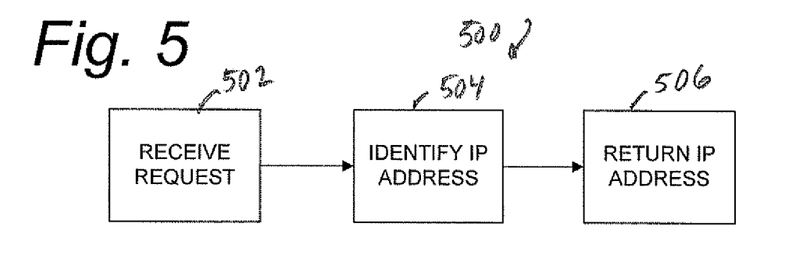
FIG. 5 is a chart showing an example of a method for handling IP requests using flexible expression-based root domain names.

A method 500 for use of a domain name expression is shown in FIG. 5. The steps of receiving a request 502 and returning an IP address may be conventional as known in the art for domain name systems. That is, incoming requests and the resulting IP addresses may be handled as in a conventional system. The intervening step 504 of identifying an IP address, however, is not conventional. Step 504 may be performed according to one of the two basic system types diagrammed in FIGS. 2A and 2B. For a system type 200, the name server operates a separate process of determining whether a root domain specified by an incoming URL matches any pattern defined by a registered expression. So long as the registration process is operating correctly, any root domain that matches an expression pattern will match one, and only one, expression pattern. Hence, a single registered expression, and its associated IP address, is uniquely identifiable by making a match. Once a match is made, the IP address may be returned in a conventional fashion 506.

For system type 250, the name server merely checks its zone file in a conventional fashion. However, in this type of system the zone file is not constructed in a conventional fashion. Instead, the zone file contains entries that are automatically generated from registered expressions, to thereby include a record for every possible root domain matching a registered expression. Each such match is recorded in the zone file as associated with the IP address for the registered expression that it matches. Again, presuming a correctly operating expression registration process, each matching domain name will be assigned one and only one IP address.

The systems and methods disclosed herein may be implemented through application software, firmware, or other computer-readable media. Moreover, the systems and methods may be implemented using all IP configurations, including IPV4 and IPV6.

Methods 400 and 500 may be adapted to perform the various specific functions and obtain outcomes as described herein. Other programmable methods may similarly be capable of performing the described functions, and the present technology is not limited to the specific steps and sequence illustrated by methods 400 and 500, which are merely examples of suitable methods.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Having thus described illustrative embodiments of registration and use of patterns defined by expression as domain names, an enabling disclosure has been made of subject matter defined by the appended claims.

What is claimed is:

1. A method, comprising:
   receiving from a client, using at least one computer, a request to register an expression defining a set of second level root domain names as associated with one or more IP addresses in a domain name system for a wide area network, wherein the expression is defined by one or more ASCII characters and one or more wildcard or other pattern-matching symbology, and wherein the set of second level root domain names includes more than one unique second level root domain member;
   evaluating the request using at least one computer, thereby determining registrability of the set of second level root domain names based on the expression including the one or more wildcard or other pattern-matching symbology;
   reporting results of evaluating the request to the client, wherein the report includes information identifying any member of the set of second level root domain names that is already registered in the domain name system;
   preparing an modified expression by adding a term that specifically excludes at least one member of the set of second level root domain names that is already registered in the domain name system; and
   registering the modified expression defining the set of second level root domain names, the modified expression including the one or more wildcard or other pattern-matching symbology in a data file of the domain name system in association with the one or more IP addresses.

2. The method of claim 1, further comprising providing data identifying all members in the set of second level root domain names to the client.

3. The method of claim 1, further comprising further modifying the modified expression to provide a limit to the number of unique names.

4. A non-transitory computer-readable medium encoded with instructions for causing a computer to perform the steps of:
   receiving from a client, using at least one computer, a request to register an expression defining a set of second level root domain names as associated with one or more IP addresses in a domain name system for a wide area network, wherein the expression is defined by one or more ASCII characters and one or more wildcard or other pattern-matching symbology, and wherein the set of second level root domain names includes more than one unique second level root domain member;
   evaluating the request using at least one computer, thereby determining registrability of the set of second level root domain names based on the expression including the one or more wildcard or other pattern-matching symbology;
   reporting results of evaluating the request to the client, wherein the report includes information identifying any member of the set of second level root domain names that is already registered in the domain name system;
   preparing an modified expression by adding a term that specifically excludes at least one member of the set of second level root domain names that is already registered in the domain name system; and
   registering the modified expression defining the set of second level root domain names, the modified expression including the one or more wildcard or other pattern-matching symbology in a data file of the domain name system in association with the one or more IP addresses.

5. The computer-readable medium of claim 4, wherein the instructions further comprise further modifying the modified expression to provide a limit to the number of unique names.

6. The computer-readable medium of claim 4, wherein the instructions further comprising providing data identifying all members in the set of second level root domain names to the client.

7. An apparatus comprising a processor coupled to a memory, the memory holding instructions that when executed by the processor cause the apparatus to perform:
   receiving from a client a request to register an expression defining a set of second level root domain names as associated with one or more IP addresses in a domain name system for a wide area network, wherein the expression is defined by one or more ASCII characters and one or more wildcard or other pattern-matching symbology, and wherein the set of second level root domain names includes more than one unique second level root domain member;

evaluating the request, thereby determining registrability of the set of second level root domain names based on the expression including the one or more wildcard or other pattern-matching symbology;

reporting results of evaluating the request to the client, wherein the report includes information identifying any member of the set of second level root domain names that is already registered in the domain name system;

preparing an modified expression by adding a term that specifically excludes at least one member of the set of second level root domain names that is already registered in the domain name system; and registering the modified expression defining the set of second level root domain names, the modified expression including the one or more wildcard or other pattern-matching symbology in a data file of the domain name system in association with the one or more IP addresses.

8. The apparatus of claim 7, wherein the memory holds further instructions for further modifying the modified expression to provide a limit to the number of unique names.

9. The apparatus of claim 7, wherein the memory holds further instructions for providing data identifying all members in the set of second level root domain names to the client.

* * * * *